(12) United States Patent
De et al.

(10) Patent No.: US 11,681,603 B2
(45) Date of Patent: Jun. 20, 2023

(54) COMPUTER GENERATION OF ILLUSTRATIVE RESOLUTIONS FOR REPORTED OPERATIONAL ISSUES

(71) Applicant: International Business Machines Corporation, Armonk, NY (US)

(72) Inventors: Radha Mohan De, Howrah (IN); Sujoy Roy, Kolkata (IN); Somnath Das, Kolkata (IN); Shivalik Chakravarty, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 17/301,298

(22) Filed: Mar. 31, 2021

(65) Prior Publication Data

US 2022/0318125 A1 Oct. 6, 2022

(51) Int. Cl.
| | | |
|---|---|---|
| G06F 11/00 | (2006.01) | |
| G06F 11/34 | (2006.01) | |
| G06N 20/00 | (2019.01) | |
| G06F 11/36 | (2006.01) | |

(52) U.S. Cl.
CPC ...... *G06F 11/3476* (2013.01); *G06F 11/3438* (2013.01); *G06F 11/3612* (2013.01); *G06N 20/00* (2019.01)

(58) Field of Classification Search
CPC .................. G06F 11/3438; G06F 11/3612
See application file for complete search history.

(56) References Cited

U.S. PATENT DOCUMENTS

| | | | |
|---|---|---|---|
| 6,807,583 B2 | 10/2004 | Hrischuk | |
| 9,298,535 B2 | 3/2016 | Haines | |
| 10,175,665 B2* | 1/2019 | Mandle | ............... H04L 43/0817 |
| 2003/0028858 A1 | 2/2003 | Hines | |
| 2011/0167412 A1 | 7/2011 | Kahlon | |
| 2014/0193047 A1* | 7/2014 | Grosz | .................... G06Q 10/10 |
| | | | 382/118 |

(Continued)

FOREIGN PATENT DOCUMENTS

WO 2020069218 A1 4/2020

OTHER PUBLICATIONS

Mell, et al., "The NIST Definition of Cloud Computing", National Institute of Standards and Technology, Special Publication 800-145, Sep. 2011, 7 pages.

*Primary Examiner* — Amine Riad
(74) *Attorney, Agent, or Firm* — Michael A. Petrocelli

(57) ABSTRACT

An illustrative resolution is generated using a computer for a reported operational issue while using a computer system. A learning model is developed using the computer to facilitate resolving an operational error of a computer system. The learning model can include generating an error report, based on tracking user inputs into a computer system and a plurality of state transitions of the computer system, respectively, when the operational error is not resolved by the user inputs. An error screenshot for each operational step associated with the user inputs is generated. A state transition is cross referenced to a corresponding operational step, and to a best practice in a user's manual, respectively. A deviation of an operational step from a best practice in the user's manual, respectively, is generated. An error screenshot is marked illustratively to show the deviation from the best practice in comparison to the operational step.

19 Claims, 9 Drawing Sheets

(56) References Cited

U.S. PATENT DOCUMENTS

| | | | |
|---|---|---|---|
| 2014/0195921 A1* | 7/2014 | Grosz | G06F 3/1205 |
| | | | 715/738 |
| 2015/0066820 A1* | 3/2015 | Kapur | G06N 20/00 |
| | | | 706/12 |
| 2018/0181446 A1 | 6/2018 | Bequet | |
| 2019/0089577 A1 | 3/2019 | Misra | |
| 2020/0159600 A1 | 5/2020 | Thakore | |
| 2021/0150386 A1* | 5/2021 | De | G06F 16/24578 |
| 2022/0114310 A1* | 4/2022 | Berti | G06N 20/00 |

* cited by examiner

COMPUTER GENERATION OF ILLUSTRATIVE RESOLUTIONS FOR REPORTED OPERATIONAL ISSUES

BACKGROUND

The present disclosure relates to a learning model, using a computer, for generating an illustrative resolution for a reported operational issue while using a computer system.

In one example, a user using a computer system can experience an operational issue with the computer system. The user may seek the guidance from available self-help sources. Such sources can include a user's manual, or on-line guidance, for example, resource provided on a computer network or via the Internet. Other examples of self-help can include a chatbot which can help a user resolve a computer or operational issue. The user may also seek help resolving the operational issue by contacting a help desk or support team. Such contact can include a chat using the computer or a telephone call using a service number. A support team or help desk can be part of an organization or a service provided by a remote team.

Chatbots and other self-help techniques can lack specificity in identifying a computer or operational issue. This can be frustrating to a user in their attempt to resolve an issue. In one example scenario, when operational issues on a computer system are reported to an operations support team, the expectation can be guiding a user in the resolution process, even if a best practice user manual is provided prior to the operational issue. Manuel guidance by a support team member can be undesirable, for example, due to the cost for human support, and maintenance of a support team. Also, a user may have to wait for a support team member to become available, thus the user spends more time resolving an operational issue.

SUMMARY

The present disclosure recognizes the shortcomings and problems associated with current techniques for generating an illustrative resolution for a reported operational issue while using a computer system.

In one example, the present invention can include using a causal analysis to compare reported operational issues with a best practice manual to generate an illustrative resolution document, and dispatch it to the reporting user for applying the same on an operational system or apply automatically by choice. Thereby, the present disclosure reduces dependency on a human support team, and enables automation of support for an operational issue. Thus, an example of the present invention a method and system can accept the operational issues from an operation user or from an operational system itself to compare the applied practice and best practice from a user manual. The method and system can use causal analysis and computer vision for interpreting text and imagery description in an issue report.

In an aspect according to the present invention, a computer-implemented method for generating an illustrative resolution for a reported operational issue while using a computer system includes developing a learning model using a computer to facilitate resolving an operational error of a computer system. The learning model includes the following; generating an error report, using the computer, based on tracking user inputs into a computer system and a plurality of state transitions of the computer system, respectively, when the operational error is not resolved by the user inputs. The method includes generating an error screenshot for each operational step of a plurality of operational steps associated with the user inputs. The method includes cross referencing a state transition, of the plurality of the state transitions, corresponding to an operational step of the plurality of operational steps, to a best practice in a user's manual, respectively. The method includes detecting for the operational step a deviation from the best practice in the user's manual, respectively, by comparing the operational steps to respective best practices in the user's manual; and marking illustratively, on a respective error screenshot of the plurality of error screenshots, the deviation from the best practice in comparison to the operational step.

In a related aspect, the method can further include receiving input data capturing a state of an operational error at a runtime, automatically tracking the user inputs and the state transitions for each operational step of the plurality of operational steps of a logical business operation related to the user inputs to resolve the operational error.

In a related aspect, the method can further include following formatted audit log data to parse an operational workflow of the plurality of operational steps as at least part of the logical business operation.

In a related aspect, the method can further include generating a causal graph based on the cross referencing of the plurality of the state transitions for each of the plurality of the operational steps, respectively.

In a related aspect, the method can further include determining consequences of each of the operational steps using the error screenshots, respectively, based on the error report.

In a related aspect, the method can further include reading content on each of the error screenshots, to implement, at least in part, the determining of the consequences of each of the respective operational steps.

In a related aspect, the method can further include generating a resolution document including the illustrative markings of the behavioral differences on the respective error screenshot of the error screenshots.

In a related aspect, the method can further include sending the error report to operation support for use in the troubleshooting of the operational issue.

In a related aspect, the method can further include sending the resolution document to a user and/or a ticketing system.

In a related aspect, the marking can include highlighting of the deviation in an operational flow chart depicting the plurality of operations steps.

In another aspect according to the present invention, a system using a computer for generating an illustrative resolution for a reported operational issue while using a computer system can include a computer system. The computer system can include a computer processor, a computer-readable storage medium, and program instructions stored on the computer-readable storage medium being executable by the processor, to cause the computer system to perform the following functions to; develop a learning model using a computer to facilitate resolving an operational error of a computer system, the learning model includes the following; generate an error report, using the computer, based on tracking user inputs into a computer system and a plurality of state transitions of the computer system, respectively, when the operational error is not resolved by the user inputs; generate an error screenshot for each operational step of a plurality of operational steps associated with the user inputs; cross reference a state transition, of the plurality of the state transitions, corresponding to an operational step of the plurality of operational steps, to a best practice in a user's manual, respectively; detect for the operational step a deviation from the best practice in the user's manual, respectively, by comparing the operational steps to respective best practices in the user's manual; and mark illustratively, on a respective error screenshot of the plurality of error screenshots, the deviation from the best practice in comparison to the operational step.

In a related aspect, the system can include receiving input data capturing a state of an operational error at a runtime, automatically tracking the user inputs and the state transitions for each operational step of the plurality of operational steps of a logical business operation related to the user inputs to resolve the operational error.

In a related aspect, the system can include following formatted audit log data to parse an operational workflow of the plurality of operational steps as at least part of the logical business operation.

In a related aspect, the system can include generating a causal graph based on the cross referencing of the plurality of the state transitions for each of the plurality of the operational steps, respectively.

In a related aspect, the system can include determining consequences of each of the operational steps using the error screenshots, respectively, based on the error report.

In a related aspect, the system can include reading content on each of the error screenshots, to implement, at least in part, the determining of the consequences of each of the respective operational steps.

In a related aspect, the system can include generating a resolution document including the illustrative markings of the behavioral differences on the respective error screenshot of the error screenshots.

In a related aspect, the system can include sending the error report to operation support for use in the troubleshooting of the operational issue.

In a related aspect, the system can include sending the resolution document to a user and/or a ticketing system.

In another aspect according to the present invention, a computer program product for generating an illustrative resolution for a reported operational issue while using a computer system, can include a computer readable storage medium having program instructions embodied therewith. The program instructions are executable by a computer to cause the computer to perform functions, by the computer, comprising the functions to: develop a learning model using a computer to facilitate resolving an operational error of a computer system, the learning model includes the following; generate an error report, using the computer, based on tracking user inputs into a computer system and a plurality of state transitions of the computer system, respectively, when the operational error is not resolved by the user inputs; generate an error screenshot for each operational step of a plurality of operational steps associated with the user inputs; cross reference a state transition, of the plurality of the state transitions, corresponding to an operational step of the plurality of operational steps, to a best practice in a user's manual, respectively; detect for the operational step a deviation from the best practice in the user's manual, respectively, by comparing the operational steps to respective best practices in the user's manual; and mark illustratively, on a respective error screenshot of the plurality of error screenshots, the deviation from the best practice in comparison to the operational step.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Figure 1:
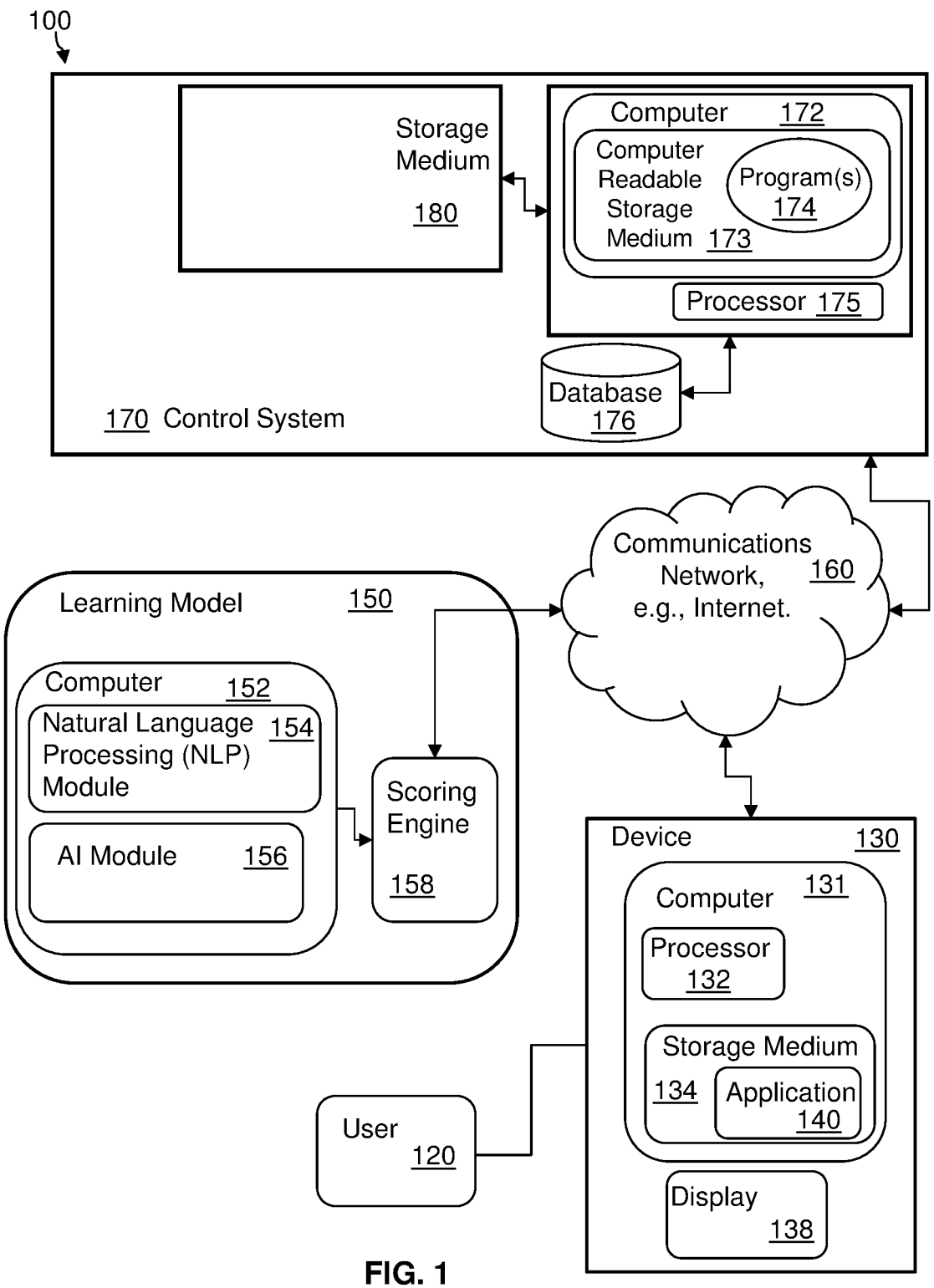
FIG. 1 is a schematic block diagram illustrating an overview of a system, system features or components, and methodology for generating an illustrative resolution for a reported operational issue while using a computer system, according to an embodiment of the present disclosure.
Figure 2:
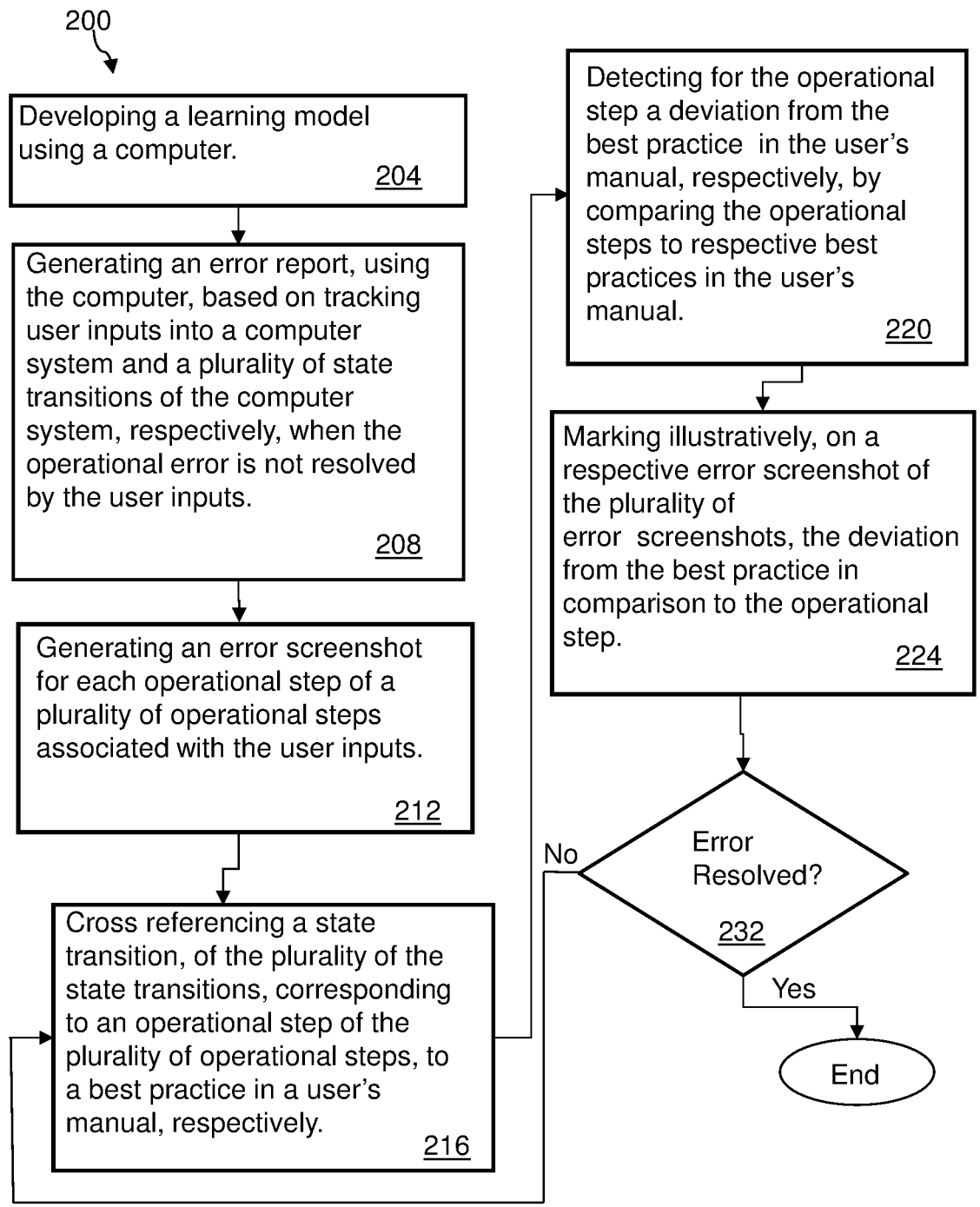
FIG. 2 is a flow chart illustrating a method, implemented using the system shown in FIG. 1, for generating an illustrative resolution for a reported operational issue while using a computer system, according to an embodiment of the present disclosure.
Figure 3:
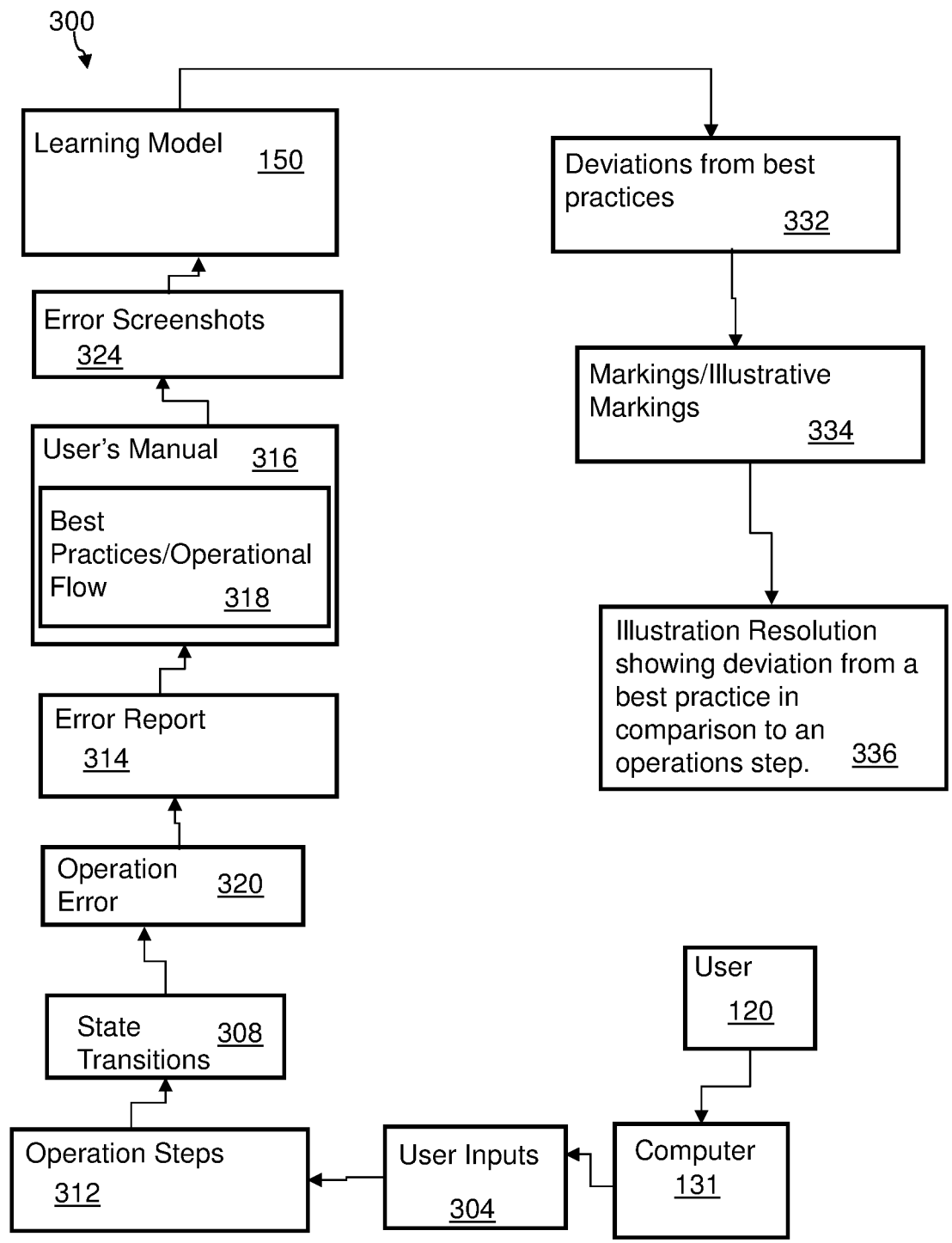
FIG. 3 is a functional schematic block diagram showing a series of operations and functional methodologies, for instructional purposes illustrating functional features of the present disclosure associated with the embodiments shown in the FIGS., for generating an illustrative resolution for a reported operational issue while using a computer system.

Referring to FIGS. 1, 2 and 3, a computer-implemented method 200 is used for generating an illustrative resolution 336 for a reported operational issue or error 320 while using a computer system, according to an embodiment of the present disclosure. The computer system can be a local device 130 or also include, in whole or in part, a remote computer. The method 200 includes a-series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes developing a learning model 150 using a computer 131, as in block 204, to facilitate resolving an operational error 320 of a computer system 130. Developing (which can include creating, and/or generating) a learning model 150 using a computer 152, as in block 204, which can include, as all or in part, an Artificial Intelligence component or module 156. The learning model facilitates resolving an operational error of a computer system. Developing the learning model includes the following operations.

The method includes generating an error report 314, using the computer 131, based on tracking user inputs 304 into a computer system 130 and a plurality of state transitions 308 of the computer system, respectively, when the operational error 320 is not resolved by the user inputs, as in block 208. For example, a user can input into an application 140 or program hosted on a computer system 130, and the application has an operational flow 318 to use the program properly. In further examples, the program can be for any number of computer uses including business uses, recreational, or functional. For each operational step there is a state transition of the computer system as reflected in the software or application, and can be displayed to the user on a display using the software, which correspond to each input from the user. Continuing with the example, in the case when an error or issue has occurred in the computer system, the user can input, using a computer, a number of operational steps to resolve the error. When the error is not resolved, these operational steps initiated by the user inputs have each cause corresponding state transition in the computer system receiving the user inputs. Thus, a number of operation steps have occurred which did not resolve the error. Such operations steps have caused a divergence from an operational flow 318 which should have been used to resolve the error 320 or issue.

The method 200 includes generating an error screenshot 324 for each operational step of a plurality of operational steps 312 associated with the user inputs, as in block 212. For example, an error screen can be displayed on a display 138 of a user's device 130, and the error screen 324 can be captured. The error screen can be captured for each associated operational step which was initiated by the user's inputs in attempting to correct the error or issue. For example, error screens can be captured by screen shots which can be initiated programmatically. For instance, a program can include instructions to initiate capturing an error screen when an error screen is detected.

The method includes cross referencing a state transition, of the plurality of the state transitions 308, corresponding to an operational step of the plurality of operational steps 312, to a best practice 318 in a user's manual 316, respectively, as in block 216. For example, the state transition can include a state for the computer system which are associated to each of the operation steps initiated by the user 120 with user inputs 304.

The method includes detecting for the operational steps (also referred to as a user operational flow) a deviation from the best practice 318 (also referred to as the operational flow) in the user's manual, respectively, by comparing the operational steps to respective best practices in the user's manual, as in block 220. For example, the operational steps initiated by the user inputs can deviate 332 or detour from operations steps indicated as best practice in the user's manual.

The method includes marking illustratively 334, on a respective error screenshot of the plurality of error screenshots 324, the deviation 332 from the best practice in comparison to the operational step. For example, the marking 334 can include highlighting, or one or more arrows, descriptive test, or the like. The marking(s) can be placed on or displayed on the error screenshot. The marking(s) can illustrate the deviation from the best practice steps in the owner's manual. The illustrative markings can be compiled or shown in an illustrative resolution or report 336. Such illustration can also include highlighting the operational steps which deviated from the owner's manual. In another example, the illustration can include text or an image showing an operational step from the owner's manual next to or superimposed over the error screen shot, or both highlighting and superimposing.

The method includes determining when the error is resolved at block 232. When the error is not resolved, the method returns to block 216. When the error in resolved, the method ends.

Figure 4:
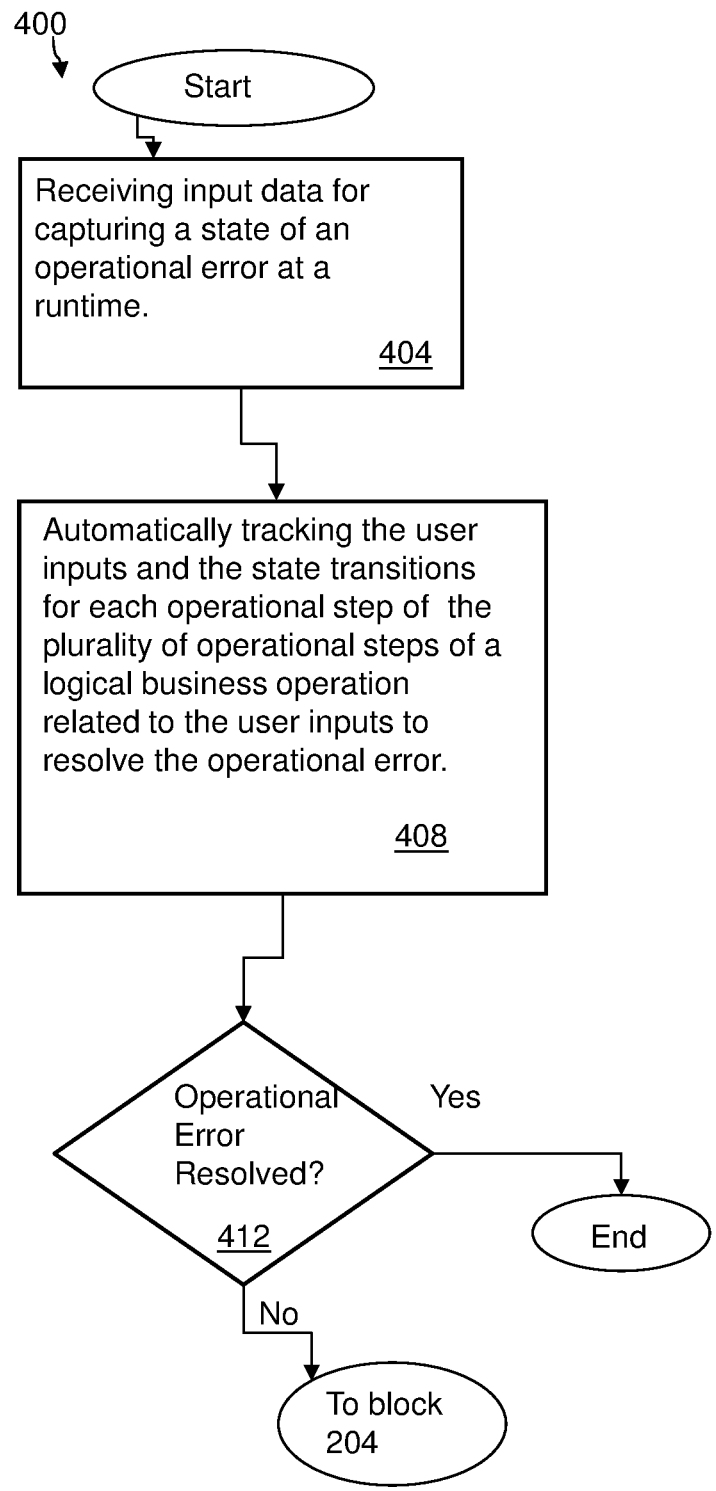
FIG. 4 is a flow chart illustrating another method, which continues from the flow chart of FIG. 2, for generating a computer model for generating an illustrative resolution for a reported operational issue while using a computer system, according to an embodiment of the present disclosure.

Referring to FIG. 4, in an alternative embodiment according to the present disclosure, a method 400 can start by receiving input data capturing a state of an operational error at a runtime, as in block 404.

The method further includes automatically tracking the user inputs and the state transitions for each operational step of the plurality of operational steps of a logical business operation related to the user inputs to resolve the operational error, as in block 408.

When the operational error is not resolved, at block 412, the method can proceed to block 204 of the method 200 shown in FIG. 2. When the operational error is resolved, at block 412, the method can end.

In one example according to the present disclosure, a method can include following formatted audit log data to parse an operational workflow of the plurality of operational steps as at least part of the logical business operation.

In another example according to the present disclosure, a method can include generating a causal graph based on the cross referencing of the plurality of the state transitions for each of the plurality of the operational steps, respectively.

In another example according to the present disclosure, a method can include determining consequences of each of the operational steps using the error screenshots, respectively, based on the error report.

In another example according to the present disclosure, a method can include reading content on each of the error screenshots, to implement, at least in part, the determining of the consequences of each of the respective operational steps.

In another example according to the present disclosure, a method can include generating a resolution document including the illustrative markings of the behavioral differences on the respective error screenshot of the error screenshots.

In another example according to the present disclosure, a method can include sending the error report to operation support for use in the troubleshooting of the operational issue.

In another example according to the present disclosure, a method can include sending the resolution document to a user and/or a ticketing system.

In another example according to the present disclosure, a method can include the marking(s) can include highlighting of the deviation in an operational flow chart depicting the plurality of operations steps.

In one example, receiving input at the computer 152 from a user 120, wherein the input includes information regarding the operational error which can include text or audio input, can be translated using a NLP (Natural Language Processing) module 154.

As discussed above, the user 120 can user a device 130 having a computer 131 which includes a processor 132, and a storage medium 134 which includes an application 140. The device 130 can include a display 138. The device 130 can communicate with the learning model 150 via the communications network 160. Further, the device can communicate via the communications network 160 to a control system 170.

Other Embodiments and Examples

Referring to FIG. 1, the user device 130 includes a computer 131 having a processor 132 and a storage medium 134 where an application 140, can be stored. The application can embody the features of the method of the present disclosure as instructions. The user can connect to a learning engine 150 using the device 130. The device 130 which includes the computer 131 and a display or monitor 138. The application 140 can embody the method of the present disclosure and can be stored on the computer readable storage medium 134. The device 130 can further include the processor 132 for executing the application/software 140. The device 130 can communicate with a communications network 160, e.g., the Internet.

It is understood that the user device 130 is representative of similar devices which can be for other user, as representative of such devices, which can include, mobile devices, smart devices, laptop computers etc.

In another example and embodiment, profiles can be saved for users/participants. Such profiles can supply data regarding the user and history of deliveries for analysis. When a profile is not found at block 112, the method creates a profile at block 116.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data can be stored (not shown). User profiles (not shown) can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

Additionally, the method and system is discussed with reference to FIG. 3, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

More Embodiments and Examples

In other examples and embodiments according to the present disclosure, a method and system can focus on automating an error resolution note preparation through using causal analysis in response to a submitted error report by an operating user.

In an example method and system according to the present disclosure, an automated computer system for generating an illustrative resolution note for a reported operational issue can apply to a business process to help operation support resolve an operational issue without manual intervention. More particularly, the method and system can include capturing a state of an operational error at runtime by internally tracking user inputs and a state transition for each step for a logical business operation. A formatted audit log data is followed to understand the operational workflow to support the process, and an error report to dispatch the operational workflow to operation support is generated. The method and system can suggest to operation support to help its users to follow an operation manual, which can be created by an operation using a Behavior Driven Test (BDT).

Continuing with the above method and system, upon receiving the error report, the method and system analyzes the error report with an AI (Artificial Intelligence) based technique to understand inputs and outputs, apply a computer vision technique to find consequences of each operational steps from an error screenshot (that is, reading content on a screenshot) to cross check the state transition flow referring from an already created manual for automatically creating a causal graph. On successful detection of a deviation in the operational flow from a given best practice in the user manual, the method and system can create a causal graph and generates a resolution document. The resolution document includes illustrative marks of behavioral differences in the screenshot, and the resolution document can be dispatched to a reporting user using a communication channel, for example, email, or messaging system, or a ticketing system.

In another example and embodiment according to the present disclosure, a user manual can be generated with help of a Behavior Driven Test (BDT) for each unit or step of operational performances, along with screenshots. The user manual can then be used for generating a causal graph for user performed operations with input information in spatiotemporal context. In another example, the user manual can be under continuous improvement by subject matter expert (SME) input, operation user input, and can consume or input continuous or periodic changes in an application. Also, the resolution note or resolution document can be referred to cognitively analysis to analyze error reports and generate operation improvement suggestions.

In another example and embodiment according to the present disclosure, a manual can be generated from BDT output, with a resultant screenshot for each unit task in an application or operational process. The user manual can be provided to a user who is supposed to understand the manual and apply instructions in the manual on a respective application or operational process with the best of knowledge.

The method can be automated and follows user performance live until a logical boundary of the unit task in the application to capture user input and operational steps from an audit log information. If the operation completes flawlessly, that is, without error, the automated method can drop the performance flow or the user operational flow. If the performance flow ends with an error, the method can suggest the application let a user dispatch an error report by means of a mechanism, for example, a link or button.

The method can analyze the dispatched error report, and create a causal graph with the help of user inputs, refer to the user manual to simulate the entire state transition of performed operation that ended with the error. The method can apply AI and a computer vision technique to intelligently analyze error report by correlating user input, resulted output and error screenshot. A computer vision based system can allow reading error information from a screenshot to compare expected result with what happened to result in the error. The method can stop progressing through the causal graph as soon as the method detects a deviation from a best practice derived from the user manual. The method can create a resolution document with an illustrative screenshot and highlighting such as a colored mark highlighting a possible point of error in user operation to dispatch the same to a reporting user. A user satisfaction index can also be considered for maintaining standard error reports for future use, resulting in faster resolution of user reported issues.

An indicative representation of causal analysis can be based on a state transition flow. A causal analysis graph can include a series of operations or steps depicting state transitions. Each state $S_{i+1}$li€ $\{1, 2, \ldots, n-1\}$, (that is, S=state; €=Epsilon (belonging to a set); i=integer; n=number) is an effect, that is generated as a result of a cause function (C), $C_i$, $i+1$, on state $S_i$ (to be moved to $S_{i+1}$). Thus, a cause is a function $f(i,o)$ with two temporal variables $i$ and $o$, where $i$ represents inputs and $o$ represents a user operation.

Embodiments and examples according to the present disclosure can include a method and system for automatic computer generation of a resolution note, which is dispatched to a user. The generation of the resolution note uses intelligent analysis of an error report, using a causal graph to compare a best practice and a performed practice that ended with the error to help an operation support team. This analysis is done without human intervention.

The method and system can create an illustrative resolution note using the causal graph based comparison between operation best practice and user performed practice that resulted in an error. An illustrative resolution note can contain screenshots with a marking (for example, using an arrow or mark), depicting the point of deviation in user performance with reference to the best practice guidance. In one example, a best practice manual can be generated using a behavior driven test (BDT) outcome and referred to for error resolution through a causal graph generation.

Figure 5:
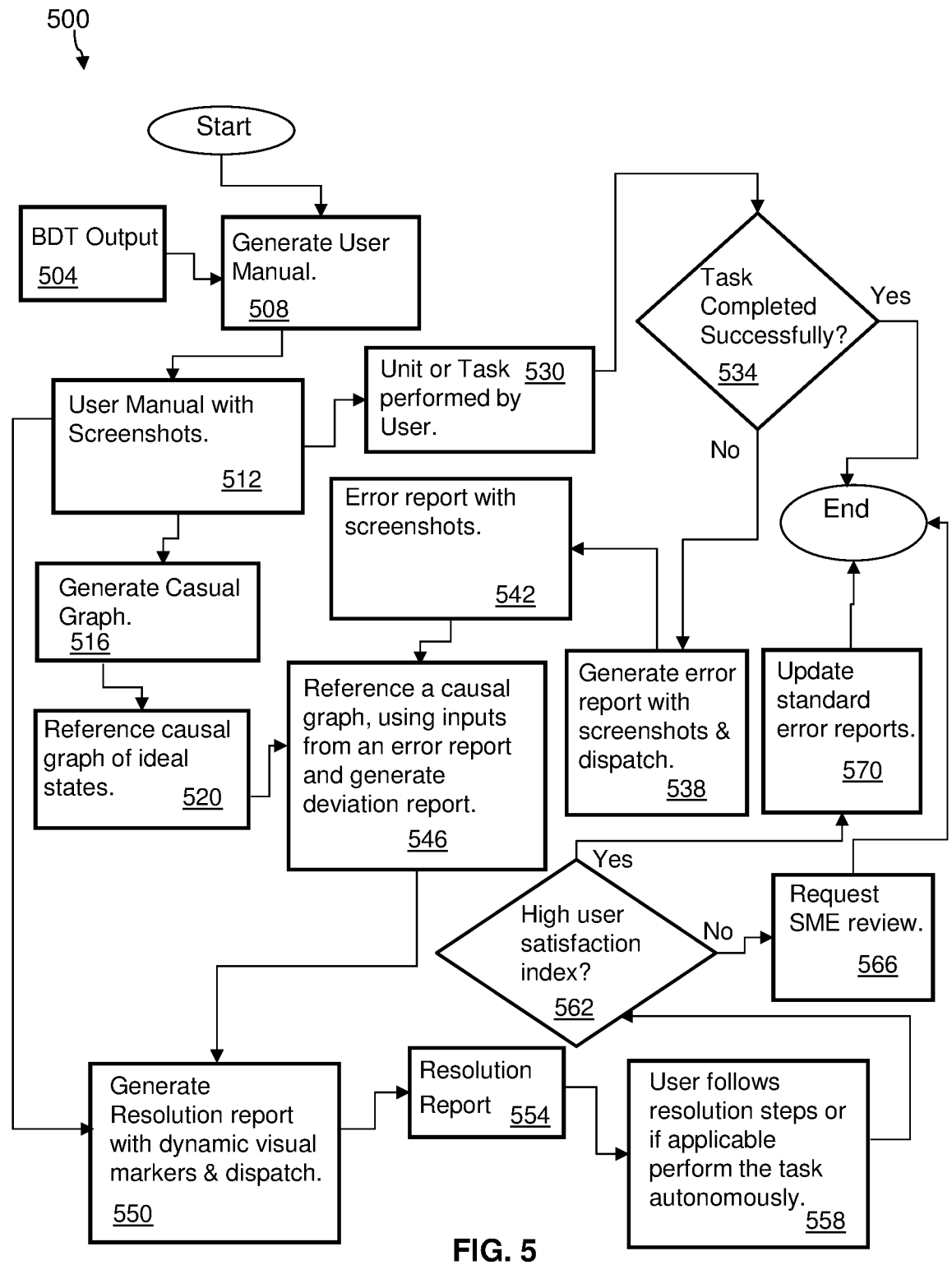
FIG. 5 is a flow chart illustrating another method, which can be implemented, at least in part, using the system shown in FIG. 1, for generating an illustrative resolution for a reported operational issue while using a computer system, according to an embodiment of the present disclosure.

Referring to FIG. 5, in one embodiment according to the present disclosure, a system 500 for generating an illustrative resolution for a reported operational issue of a computer system includes generating a user manual, as in block 508. The user's manual can be generated using a BDT (Behavior Driven Test) output 504. A user manual can be created with screenshots, as in block 512. A user manual with screen shots can be generated, as in block 512. The system 500 can generate a casual graph, as in block 516. The system can reference a causal graph of ideal states, as in block 520. A unit or task can be performed by a user as in block 530. The system can reference a causal graph, using inputs from an error report and generate a deviation report, as in block 546. The system can generate a resolution report with dynamic visual markers and dispatch the report, as in block 550. The system includes a resolution report, as in block 554. The user can follow resolution steps from the resolution report, or if applicable, perform the task autonomously, as block 558. The system can determine when a user satisfaction index is high, as in block 562, and proceed to update standard error reports, as in block 570. When the user satisfaction index is not high, as in block 562, the system proceeds to request an SME review, as in block 566. Alternatively, a unit or task performed by a user can be determined by the system, as in block 530. When the task is completed successfully, as in block 534, the system flow ends. When the task is not completed successfully, as in block 534, the system proceeds to generate an error report with screenshots and can dispatch the error report with screenshots to the user, as in block 538. The system includes an error repot with screenshots, as in block 542. The system can proceed to block 546 and proceed as described above.

According to embodiments of the present disclosure, in one example, a method and system can apply a causal graph to resolve a user reported incident. A screenshot and associated information can be correlated with a best practice, and referred to in a user manual and generated by using results of a BDT. An illustrative resolution note is created by explaining the deviation of steps in a user performed operation, in an application or process, from its correct steps as depicted or explained in a user manual. Computer vision and machine learning can be applied to understand a user operation, that ended in error, from reported screenshots, to backpropagate the steps to reach up to a point of divergence from an advised pattern (or flow or operation) in a user manual. In another example computer vision and machine learning can be used to analyze an error screenshot and engraved information or text on it from as an uninstructed way of capturing the same, using a pre-trained model from a historic behavioral pattern of a concerned application.

Operational blocks of the method 500 shown in FIG. 5 may be similar to operational blocks shown in FIGS. 1, 2, 3 and 4A and 4B. The method shown in FIG. 5 is intended as another example embodiment which can include aspects/operations shown and discussed previously in the present disclosure.

Additional Examples And Embodiments

Figure 6:
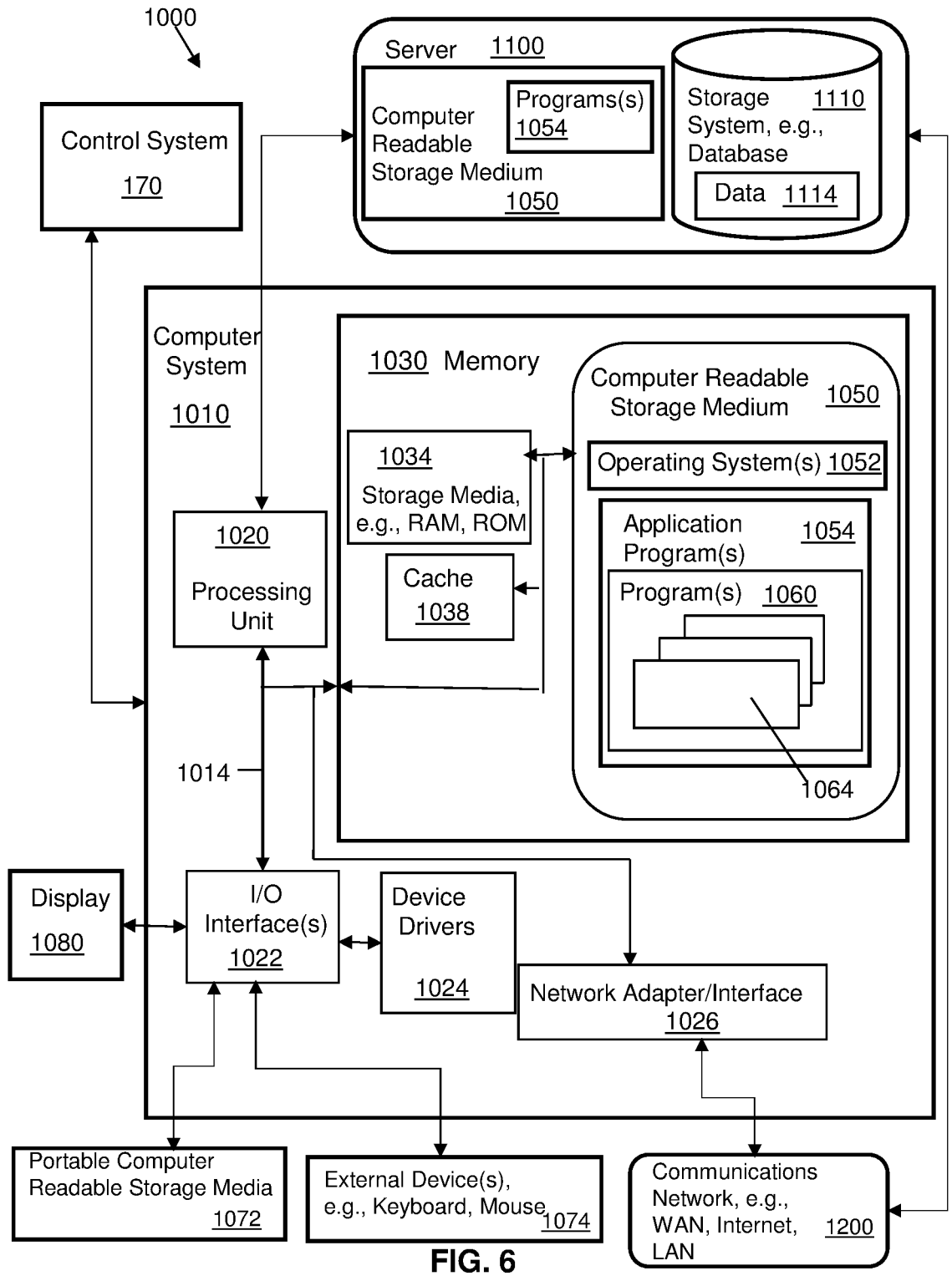
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 140, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 140 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 170 is in communication with the computer 130, and the computer can include the application or software 140. The computer 130, or a computer in a mobile device (not shown) communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 140, which can include program instructions executable using a processor 132. These features are shown herein in FIG. 1, and also in an embodiment of a computer system shown in FIG. 6 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

In an embodiment, the method and system which incorporates the present disclosure includes the control system (generally referred to as the back-end) in combination and cooperation with a front end of the method and system, which can be the application 140. In one example, the application 140 is stored on a device, for example, a computer or device on location 130, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device and computer 130 having the application 140. The application 140 is stored on the device or computer 130 and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer 131 or device 130. It is envisioned that the control system 170 can not only store the profile of users, but in one embodiment, can interact with a website for viewing on a display of a device such as a mobile device, or in another example the Internet, and receive user input related to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments And Examples

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for a learning model for generating an illustrative resolution for a reported operational issue while using a computer system.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
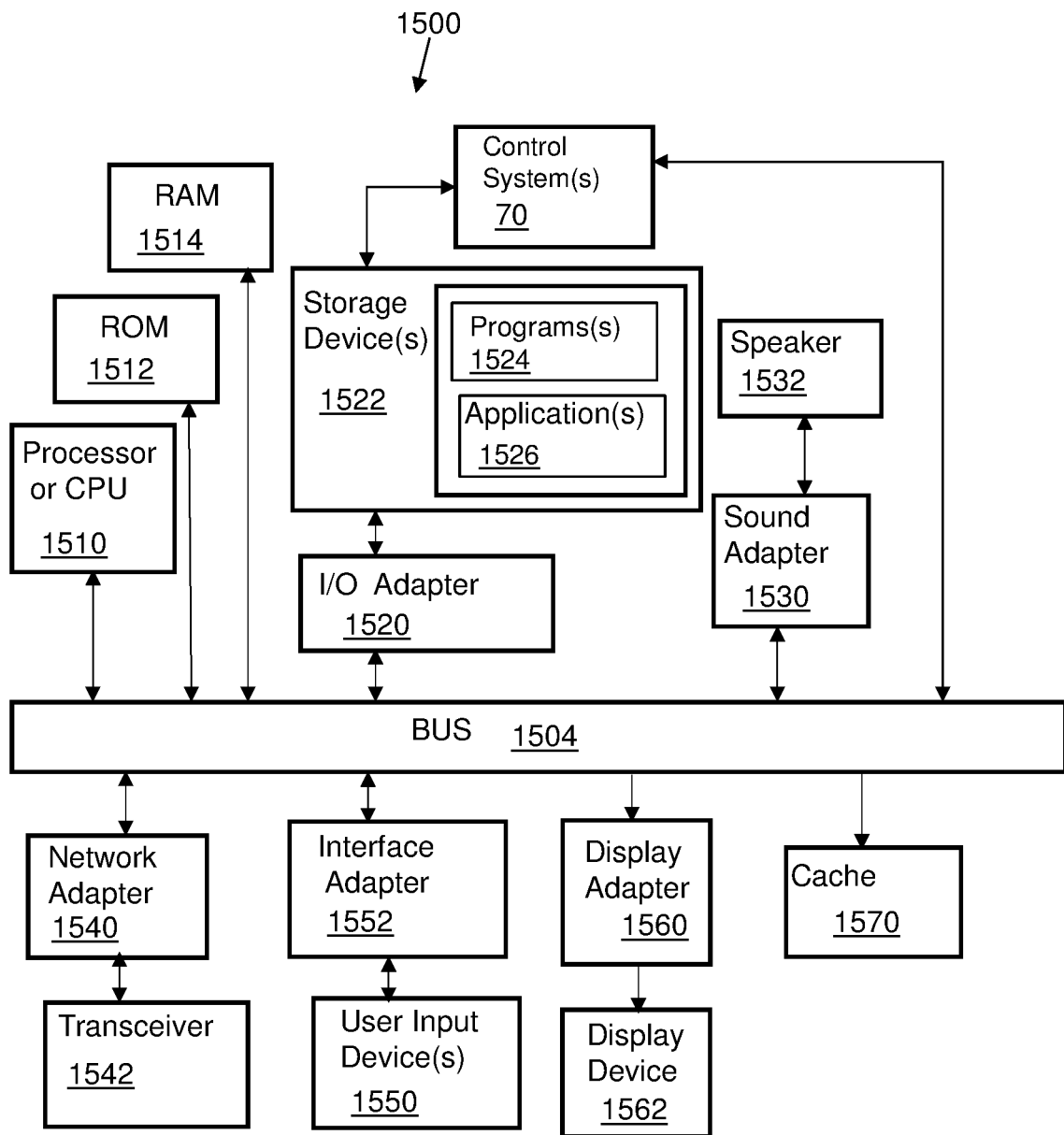
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 70 which communicates with the system bus, and thus can communicate with the other components of the system via the system bus. In one example, the storage device 1522, via the system bus, can communicate with the control system 70 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
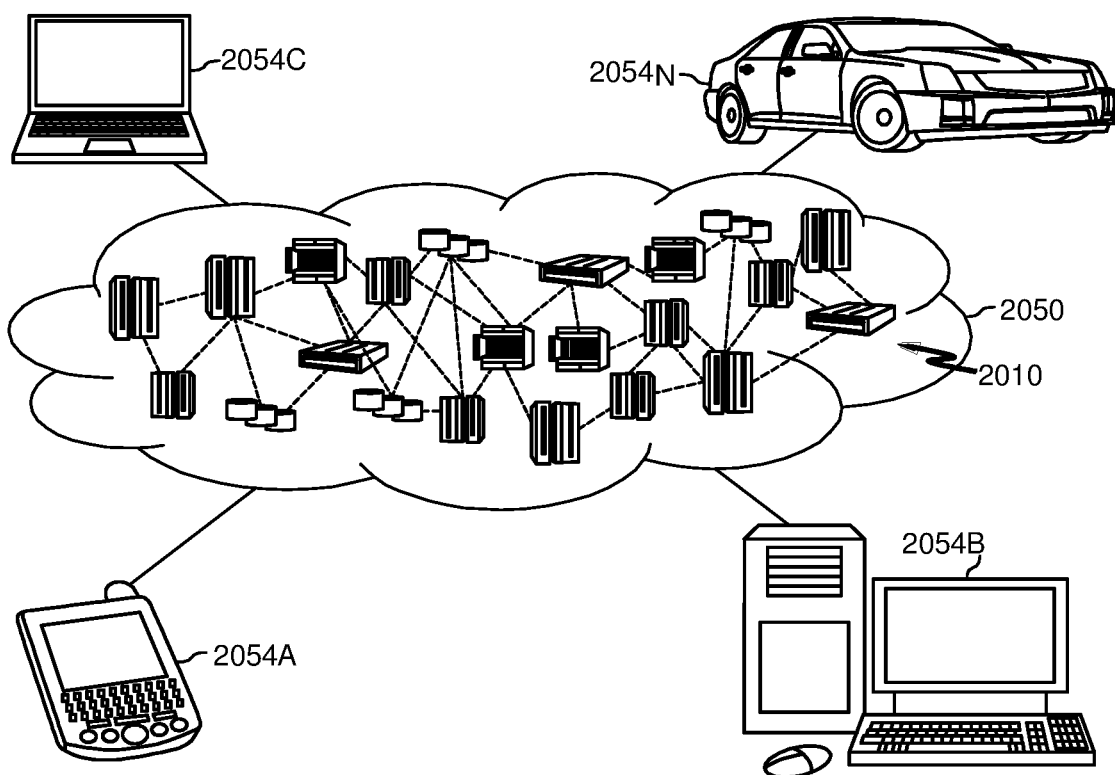
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
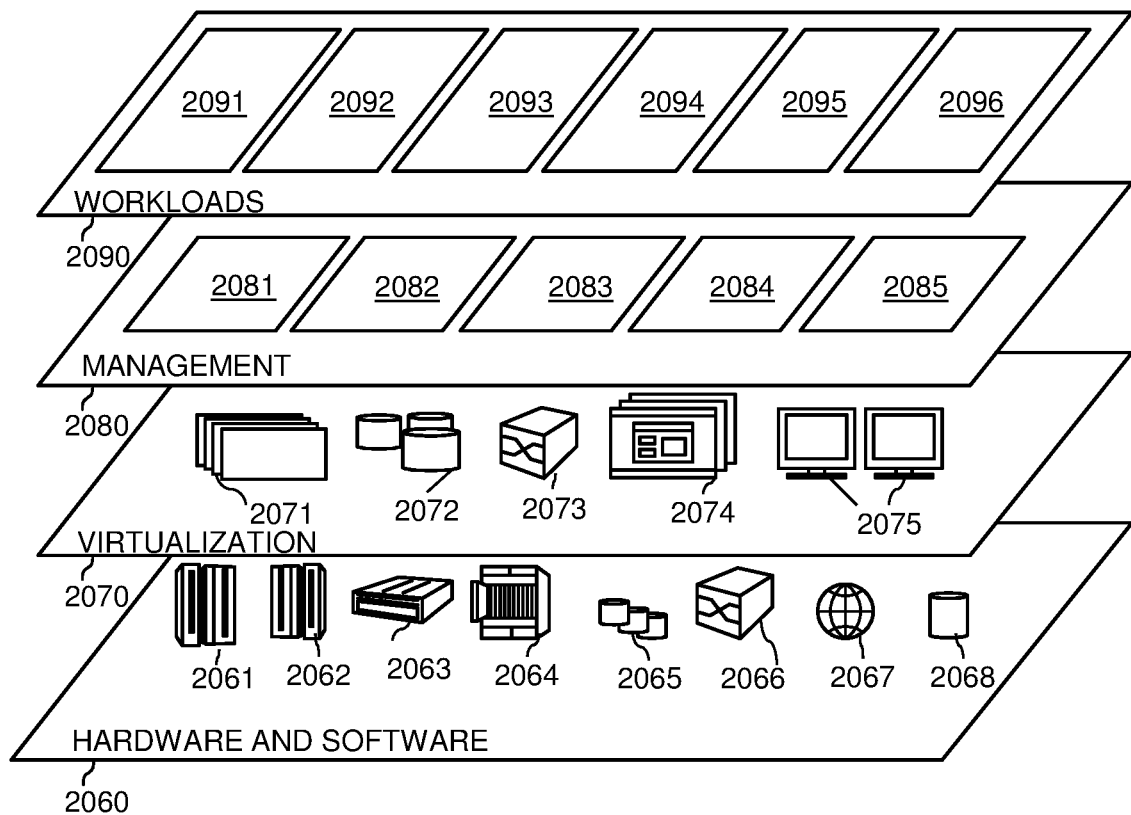
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and generating an illustrative resolution 2096, for example, for a reported operational issue or error while using a computer system.

What is claimed is:

1. A computer-implemented method for generating an illustrative resolution for a reported operational issue while using a computer system, comprising:
   developing a learning model using a computer to facilitate resolving an operational error of a computer system, the learning model includes the following;
   generating an error report, using the computer, based on tracking user inputs into a computer system and a plurality of state transitions of the computer system, respectively, when the operational error is not resolved by the user inputs;
   generating an error screenshot for each operational step of a plurality of operational steps associated with the user inputs;
   cross referencing a state transition, of the plurality of the state transitions, corresponding to an operational step of the plurality of operational steps, to a best practice in a user's manual, respectively;
   detecting for the operational step a deviation from the best practice in the user's manual, respectively, by comparing the operational steps to respective best practices in the user's manual; and
   marking illustratively, on a respective error screenshot of the plurality of error screenshots, the deviation from the best practice in comparison to the operational step, wherein the marking includes highlighting of the deviation in an operational flow chart depicting the plurality of operations steps.

2. The method of claim 1, further comprising:
   receiving input data capturing a state of an operational error at a runtime,
   automatically tracking the user inputs and the state transitions for each operational step of the plurality of operational steps of a logical business operation related to the user inputs to resolve the operational error.

3. The method of claim 2, further comprising:
   following formatted audit log data to parse an operational workflow of the plurality of operational steps as at least part of the logical business operation.

4. The method of claim 1, further comprising:
   generating a causal graph based on the cross referencing of the plurality of the state transitions for each of the plurality of the operational steps, respectively.

5. The method of claim 1, further comprising:
   determining consequences of each of the operational steps using the error screenshots, respectively, based on the error report.

6. The method of claim 1, further comprising:
   reading content on each of the error screenshots, to implement, at least in part, the determining of the consequences of each of the respective operational steps.

7. The method of claim 1, further comprising:
   generating a resolution document including the illustrative markings of behavioral differences on the respective error screenshot of the error screenshots.

8. The method of claim 1, further comprising:
   sending the error report to operation support for use in the troubleshooting of the operational issue.

9. The method of claim 1, further comprising:
   sending the resolution document to a user and/or a ticketing system.

10. A system using a computer for generating an illustrative resolution for a reported operational issue while using a computer system, which comprises:

a computer system comprising; a computer processor, a computer-readable storage medium, and program instructions stored on the computer-readable storage medium being executable by the processor, to cause the computer system to perform the following functions to;

develop a learning model using a computer to facilitate resolving an operational error of a computer system, the learning model includes the following;

generate an error report, using the computer, based on tracking user inputs into a computer system and a plurality of state transitions of the computer system, respectively, when the operational error is not resolved by the user inputs;

generate an error screenshot for each operational step of a plurality of operational steps associated with the user inputs;

cross reference a state transition, of the plurality of the state transitions, corresponding to an operational step of the plurality of operational steps, to a best practice in a user's manual, respectively;

detect for the operational step a deviation from the best practice in the user's manual, respectively, by comparing the operational steps to respective best practices in the user's manual; and mark illustratively, on a respective error screenshot of the plurality of error screenshots, the deviation from the best practice in comparison to the operational step wherein the illustrative mark includes highlighting of the deviation in an operational flow chart depicting the plurality of operations steps.

11. The system of claim 10, further comprising:
receiving input data capturing a state of an operational error at a runtime,
automatically tracking the user inputs and the state transitions for each operational step of the plurality of operational steps of a logical business operation related to the user inputs to resolve the operational error.

12. The system of claim 11, further comprising:
following formatted audit log data to parse an operational workflow of the plurality of operational steps as at least part of the logical business operation.

13. The system of claim 10, further comprising:
generating a causal graph based on the cross referencing of the plurality of the state transitions for each of the plurality of the operational steps, respectively.

14. The system of claim 10, further comprising:
determining consequences of each of the operational steps using the error screenshots, respectively, based on the error report.

15. The system of claim 10, further comprising:
reading content on each of the error screenshots, to implement, at least in part, the determining of the consequences of each of the respective operational steps.

16. The system of claim 10, further comprising:
generating a resolution document including the illustrative markings of behavioral differences on the respective error screenshot of the error screenshots.

17. The system of claim 10, further comprising:
sending the error report to operation support for use in the troubleshooting of the operational issue.

18. The system of claim 10, further comprising:
sending the resolution document to a user and/or a ticketing system.

19. A computer program product for generating an illustrative resolution for a reported operational issue while using a computer system, the computer program product comprising a computer readable storage medium having program instructions embodied therewith, the program instructions executable by a computer to cause the computer to perform functions, by the computer, comprising the functions to:

develop a learning model using a computer to facilitate resolving an operational error of a computer system, the learning model includes the following;

generate an error report, using the computer, based on tracking user inputs into a computer system and a plurality of state transitions of the computer system, respectively, when the operational error is not resolved by the user inputs;

generate an error screenshot for each operational step of a plurality of operational steps associated with the user inputs;

cross reference a state transition, of the plurality of the state transitions, corresponding to an operational step of the plurality of operational steps, to a best practice in a user's manual, respectively;

detect for the operational step a deviation from the best practice in the user's manual, respectively, by comparing the operational steps to respective best practices in the user's manual; and mark illustratively, on a respective error screenshot of the plurality of error screenshots, the deviation from the best practice in comparison to the operational step wherein the illustrative mark includes highlighting of the deviation in an operational flow chart depicting the plurality of operations steps.

* * * * *